US009180596B2

(12) United States Patent
Sim et al.

(10) Patent No.: US 9,180,596 B2
(45) Date of Patent: Nov. 10, 2015

(54) ROBOT CLEANER AND METHOD OF OPERATING THE SAME

(71) Applicant: LG Electronics Inc., Seoul (KR)

(72) Inventors: Miyoung Sim, Seoul (KR); Hyeongshin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 14/012,633

(22) Filed: Aug. 28, 2013

(65) Prior Publication Data

US 2014/0288709 A1    Sep. 25, 2014

(30) Foreign Application Priority Data

Mar. 21, 2013  (KR) .................. 10-2013-0030472

(51) Int. Cl.
| | | |
|---|---|---|
| *G05B 19/00* | (2006.01) | |
| *B25J 19/02* | (2006.01) | |
| *G05D 1/02* | (2006.01) | |
| *B25J 9/00* | (2006.01) | |
| *B25J 11/00* | (2006.01) | |

(52) U.S. Cl.
CPC ............. *B25J 19/023* (2013.01); *B25J 9/0003* (2013.01); *B25J 11/0085* (2013.01); *G05D 1/024* (2013.01); *G05D 1/0225* (2013.01); *G05D 2201/0203* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,674,048 | A * | 6/1987 | Okumura | 701/25 |
| 6,389,329 | B1 * | 5/2002 | Colens | 700/262 |
| 6,459,955 | B1 * | 10/2002 | Bartsch et al. | 700/245 |
| 2002/0193908 | A1 * | 12/2002 | Parker et al. | 700/258 |
| 2004/0199301 | A1 * | 10/2004 | Woo et al. | 701/1 |
| 2005/0156562 | A1 * | 7/2005 | Cohen et al. | 320/107 |
| 2005/0251292 | A1 * | 11/2005 | Casey et al. | 700/245 |
| 2006/0085105 | A1 * | 4/2006 | Chiu et al. | 701/23 |
| 2006/0190133 | A1 * | 8/2006 | Konandreas et al. | 700/245 |
| 2006/0190146 | A1 * | 8/2006 | Morse et al. | 701/23 |
| 2007/0016328 | A1 * | 1/2007 | Ziegler et al. | 700/245 |
| 2007/0061041 | A1 * | 3/2007 | Zweig | 700/245 |
| 2007/0192910 | A1 * | 8/2007 | Vu et al. | 901/17 |
| 2007/0213892 | A1 * | 9/2007 | Jones et al. | 701/23 |
| 2008/0015738 | A1 * | 1/2008 | Casey et al. | 700/258 |

(Continued)

FOREIGN PATENT DOCUMENTS

| | | |
|---|---|---|
| JP | H11-058271 | 3/1999 |
| KR | 10-0728225 B1 | 6/2007 |

(Continued)

*Primary Examiner* — Jonathan L Sample
(74) *Attorney, Agent, or Firm* — Dentons US LLP

(57) ABSTRACT

A robot cleaner includes a main body, a traveling unit, a cleaning unit, a sensor unit, and a controller. The traveling unit allows the main body to travel. The cleaning unit suctions foreign substances around the main body during the traveling. The sensor unit is rotatable and senses an obstacle using light reflected or scattered by the obstacle. The controller controls the traveling unit so as to travel along a traveling path and controls the cleaning unit so as to perform cleaning. Here, the sensor unit includes a first mode and a second mode that are set to differ from each other in sensitivity with respect to the reflected or scattered light, and the controller changes the sensitivity of the sensor unit according to a traveling mode.

20 Claims, 11 Drawing Sheets

(56) References Cited

U.S. PATENT DOCUMENTS

| | | | |
|---|---|---|---|
| 2008/0161969 A1* | 7/2008 | Lee et al. | 700/245 |
| 2008/0184518 A1* | 8/2008 | Taylor et al. | 15/319 |
| 2012/0089253 A1* | 4/2012 | Li et al. | 700/246 |
| 2012/0169497 A1* | 7/2012 | Schnittman et al. | 340/540 |
| 2013/0030750 A1* | 1/2013 | Kim et al. | 702/108 |
| 2013/0221917 A1* | 8/2013 | Kulkarni et al. | 320/109 |
| 2013/0226344 A1* | 8/2013 | Wong et al. | 700/258 |

FOREIGN PATENT DOCUMENTS

| | | |
|---|---|---|
| KR | 10-0738888 B1 | 7/2007 |
| KR | 10-2011-0053759 | 5/2011 |

\* cited by examiner

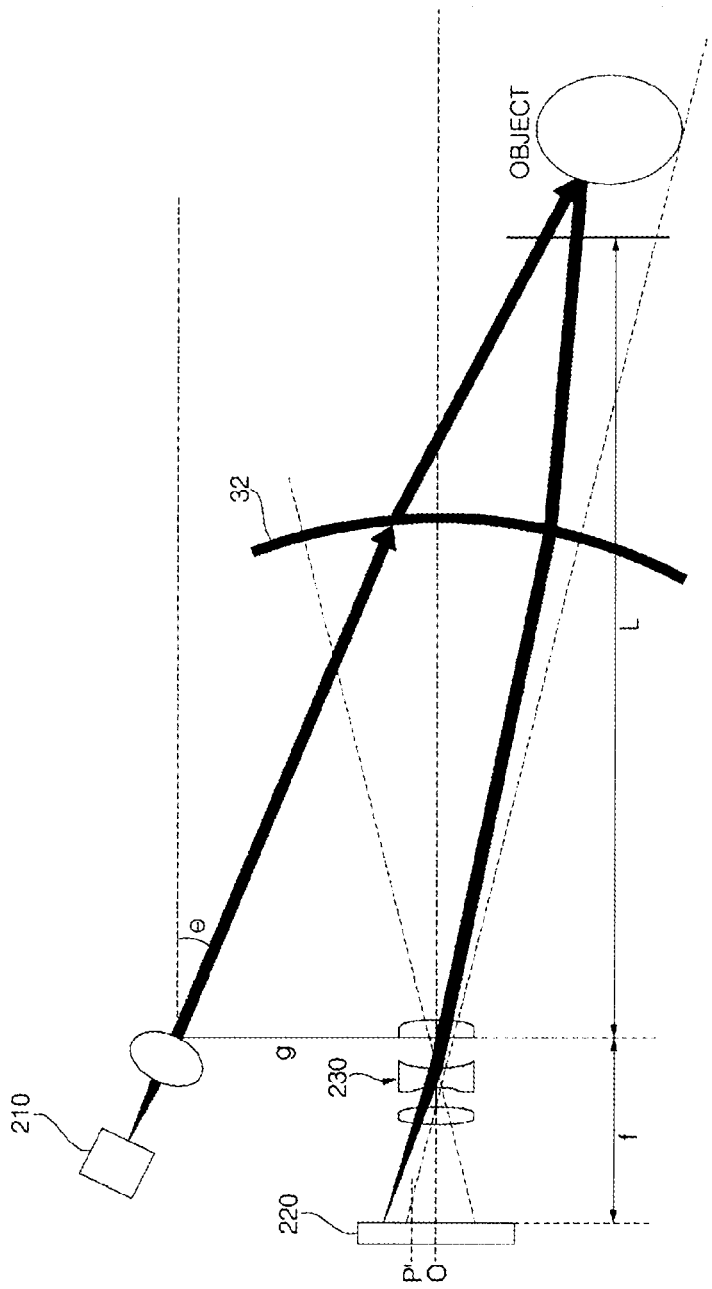

Fig. 6
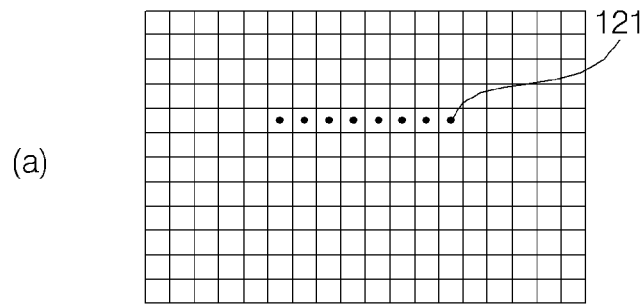
(a)
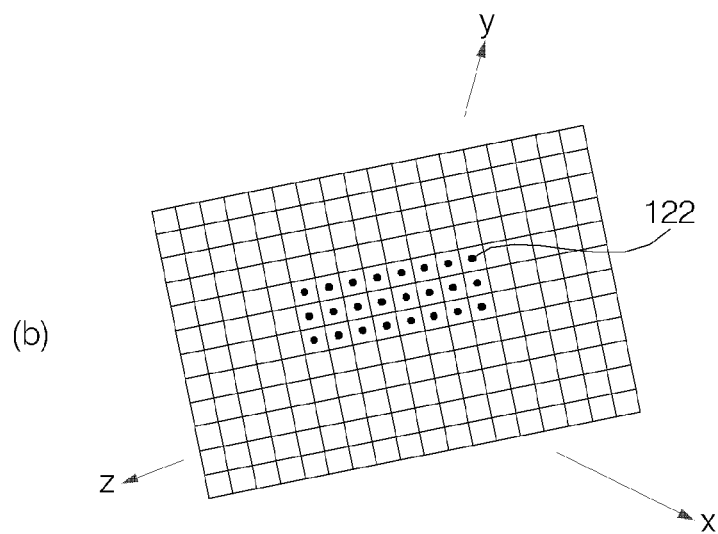
(b)

ROBOT CLEANER AND METHOD OF OPERATING THE SAME

This application claims the priority benefit of Korean Patent Application No. 10-2013-0030472, filed on Mar. 21, 2013 in the Korean Intellectual Property Office, the disclosure of which is incorporated herein by reference.

BACKGROUND

1. Field of the Disclosure

The present disclosure relates to a robot cleaner and a method of operating the robot cleaner, and more particularly, to a robot cleaner and a method of operating the robot cleaner, which travels to a target point using a robot cleaner's sensor.

2. Description of the Related Art

A robot cleaner is an apparatus that automatically cleans an area to be cleaned by traveling on its own accord and suctioning foreign substances such as dust from the floor.

Generally, robot cleaners sense distances from obstacles such as furniture, office fixtures and walls within an area to be cleaned, and avoid those obstacles by mapping the target area and controlling the driving of its left wheel and right wheel.

A robot cleaner is provided with a rechargeable battery allowing the robot cleaner to freely travel for itself using the power of the battery, and if necessary, returns to a recharging base to charge the battery.

In a related art, a traveling distance of the robot cleaner is measured by a controller using a sensor monitoring the ceiling and the floor, and based thereon, a distance from an obstacle or a target point is calculated. However, since this method is an indirect method that estimates the distance based on the traveling distance of the robot cleaner, when the traveling distance of the robot cleaner cannot be accurately measured due to an unevenness of the floor, an error inevitably occurs.

Thus, there is a limitation in the movement of the robot cleaner to an exact target point due to the distance measurement error.

SUMMARY

Thus, one object is to provide a robot cleaner and a method of operating the robot cleaner, which can travel using a sensor unit provided therein and accurately and quickly move to a target point by varying the sensitivity of the sensor unit upon traveling and searching for a recharging base.

According to one aspect, there is provided a robot cleaner including: a main body; a traveling unit allowing the main body to travel; a cleaning unit suctioning foreign substances around the main body during the traveling; a sensor unit that is rotatable to sense an obstacle using light reflected or scattered by the obstacle; and a controller for controlling the traveling unit so as to travel along a traveling path and controlling the cleaning unit so as to perform cleaning, wherein the sensor unit includes a first mode and a second mode that are set to differ from each other in sensitivity with respect to the reflected or scattered light, and the controller changes the sensitivity of the sensor unit according to a traveling mode.

According to another aspect, there is provided a method of operating a robot cleaner, including: setting a traveling mode; setting one of a first mode and a second mode having different sensitivities for incident light in a rotatable sensor unit to sense an obstacle using the incident light reflected or scattered by the obstacle; and setting, upon traveling, the sensitivity of the sensor unit to the first mode to travel to a target point avoiding an obstacle sensed by the sensor unit.

The foregoing and other objects, features, aspects and advantages will become more apparent from the following detailed description when taken in conjunction with the accompanying drawings.

BRIEF DESCRIPTION OF THE DRAWINGS

Embodiments will be described in detail with reference to the following drawings in which like reference numerals refer to like elements, and wherein:

FIGS. 5, and 6A and 6B are views illustrating an obstacle or distance sensing principle of a sensor unit;

DETAILED DESCRIPTION OF THE PREFERRED EMBODIMENTS

Figure 1:
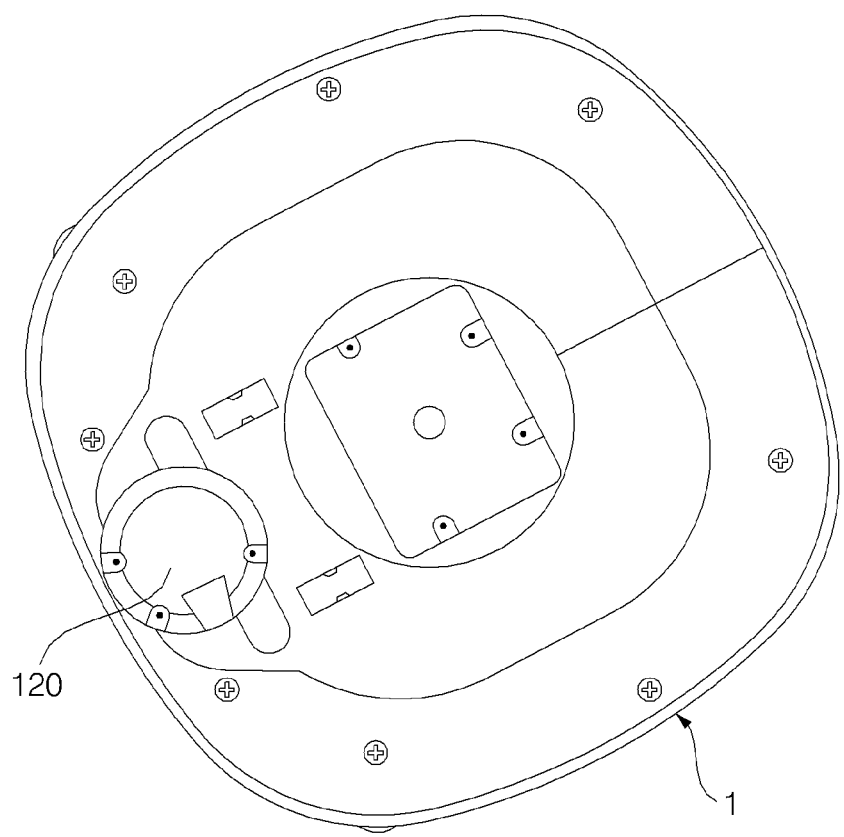
FIG. 1 is a perspective view illustrating a robot cleaner according to an embodiment of the present invention.

The foregoing and other objects, features, aspects and advantages will become more apparent from the following detailed description when taken in conjunction with the accompanying drawings. Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete to those skilled in the art. In the drawings, the shapes and dimensions may be exaggerated for clarity, and the same reference numerals will be used throughout to designate the same or like components.

Hereinafter, exemplary embodiments of the present invention will be described in detail with reference to the accompanying drawings.

Figure 2:
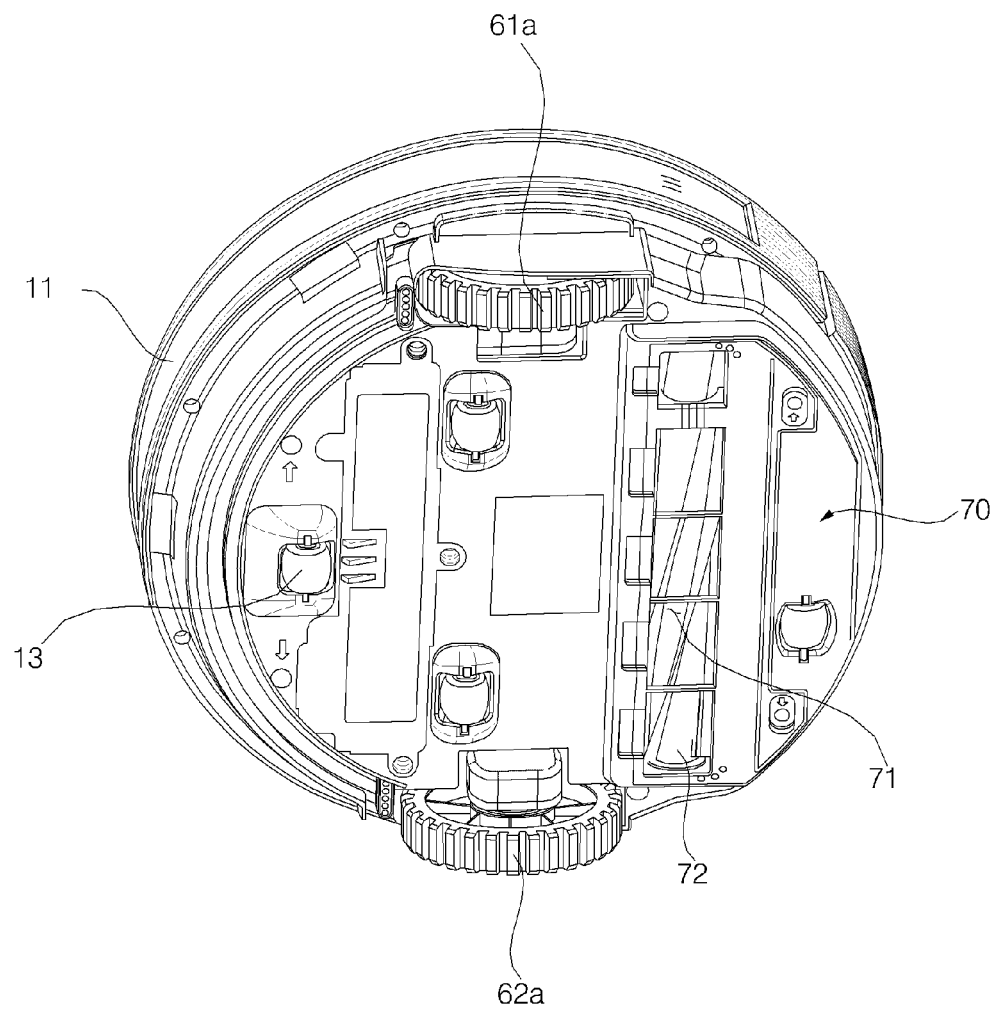
FIG. 2 is a view illustrating an undersurface of the robot cleaner of FIG. 1.

FIG. 1 is a perspective view illustrating a robot cleaner according to an embodiment of the present invention. FIG. 2 is a view illustrating an undersurface of the robot cleaner of FIG. 1.

Referring to FIGS. 1 and 2, a robot cleaner 1 according to an embodiment of the present invention may clean a certain area by suctioning ambient dust and foreign substances while traveling. An area to be cleaned may be set by manipulation of a button provided on the robot cleaner 1, and the robot cleaner 1 may perform traveling and cleaning according to the setting.

The robot cleaner 1 may be provided with a battery that allows the robot cleaner 1 to travel and clean using the power of the battery. When the power of the battery is low, the robot cleaner 1 may return to the recharging base (not shown) to charge the battery.

With a left wheel 61a and a right wheel 62a of a traveling unit rotating, the main body of the robot cleaner 1 may travel around an area (hereinafter, referred to as "cleaning area") to be cleaned to suction foreign substances such as dust or garbage through a suctioning unit 70 that is a cleaning unit.

The robot cleaner 1 may reach a target point by sensing obstacles in the traveling direction using a sensor unit 120 during the traveling and setting a traveling path so as to avoid obstacles.

The suctioning unit 70 of the cleaning unit may include a suctioning fan 71 detachably disposed in the main body 10 to generate a suctioning force and a suctioning port 72 for suctioning air flow generated by the rotation of the suctioning fan 71. Also, the suctioning unit 70 may further include a filter (not shown) for filtering foreign substances among air flow suctioned through the suctioning port 72 and a foreign substance container (not shown) for collecting foreign substances filtered by the filter. The suctioning unit 70 may be separated from the main body to replace the filter or discard foreign substances collected in the foreign substance container.

The traveling unit may include a traveling drive unit for driving the left wheel 61a and the right wheel 62a, and may include a left wheel drive unit (not shown) for driving the left wheel and a right wheel drive unit (not shown) for driving the right wheel 62a.

As the operation of the left wheel drive unit and the right wheel drive unit is independently controlled by control commands of the controller, the main body may move forward and backward or turn around. For example, when the left wheel is rotated in the forward direction by the left wheel drive unit and the right wheel is rotated in the backward direction by the right wheel drive unit, the main body may turn to the left or right. The controller may control the rotational speed of the left wheel drive unit and the right wheel drive unit to differ from each other. Thus, the translational motion of the main body that can perform both rectilinear motion and rotational motion can be induced. The motion of the main body by the control of the controller 90 enables avoidance or turning with respect to obstacles. The robot cleaner 1 may further include at least one auxiliary wheel 13 to stably support the main body.

The main body of the robot cleaner 1 may include a lower body 11 that houses the rotation drive unit, the rising & falling drive unit, and the traveling unit, and an upper body that covers the lower body 11.

Figure 3:
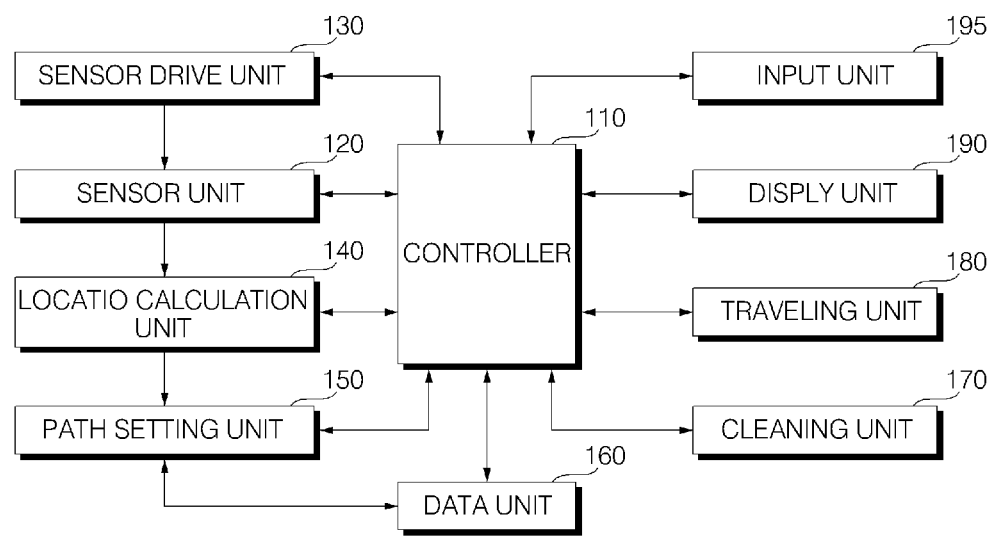
FIG. 3 is a view illustrating a control configuration of a robot cleaner according to an embodiment of the present invention.

FIG. 3 is a view illustrating a control configuration of a robot cleaner according to an embodiment of the present invention.

Referring to FIG. 3, a robot cleaner 1 may include a sensor unit 120, a sensor drive unit 130, a location calculation unit 140, a path setting unit 150, an input unit 195, a display unit 190, a traveling unit 180, a cleaning unit 170, a data unit 160, and a controller 110 for controlling the overall operation of the robot cleaner 1.

Also, the robot cleaner 1 may further include a battery (not shown). In this case, the battery may have power such that the robot cleaner 1 can travel and clean a cleaning area. When the power of the battery is low, the robot cleaner 1 may be supplied with a charging current from a recharging base (not shown). The battery may be connected to a sensing unit for sensing the residual value of the battery, so that the residual value and the charging condition of the battery may be sent to the controller 110.

The input unit 195 may include at least one of buttons, switches, and wheels. If necessary, the input unit 195 may include a touch pad that recognizes a pressure or an electrostatic input. Inputted data to the input unit 195 may be sent to the controller 110.

For example, the input unit 195 may include buttons or switches for setting the mode, the cleaning area, and the recharging base location, and may send the setting information to the controller 110.

The display unit 190 may include a display device for visually displaying information. The display unit 190 may output information on the operation state and the cleaning setting of the robot cleaner 1. The display unit 190 may display current cleaning setting and mode, and a residual value of the battery. Also, the display unit 190 may display the power input and the operation of the robot cleaner 1 through the lighting of lamps, and may display a warning light or message upon occurrence of errors.

In this case, the robot cleaner 1 may further include a speaker that outputs a sound in addition to the display unit 1.

The display unit 190 may include at least one of 7-segment LED, Light Emitting Polymer Display (LPD), liquid crystal display, thin film transistor-liquid crystal display, organic light emitting diode, flexible display, and 3D display. The display unit 190 may be configured with a touch screen, but the present invention is not limited thereto.

In this case, the robot cleaner 1 may further include an input/output controller (not shown) that relays and processes data from the input unit 195, the display unit 190, and the controller 110. Also, the input unit 195 and the display unit 190 may include a plurality of interfaces corresponding to commands for performing functions mentioned above or programs stored in the data unit 160.

The data unit 160 may store data according to the operation control and the operation setting of the robot cleaner 1 and control data for functions that are performed by the robot cleaner 1. Also, the data unit 160 may temporarily store signals sensed by the sensor unit 120, and may store data calculated by the location calculation unit 140 and the path setting unit 150.

The traveling unit 180 may rotate the left wheel 61a and the right wheel 62a to move the robot cleaner 1. In this case, the traveling unit 180 may further include a motor that is connected to the wheels 61a and 62a to allow the wheels 61a and 62a to rotate. The motor may be driven by control commands of the controller 110 to allow the robot cleaner 1 to travel in a certain area.

The cleaning unit 170 may suction dust and foreign substances on the floor or around the robot cleaner 1 during the traveling. In this case, the cleaning unit 170 may be provided with the suctioning unit 70 as described above, and may be provided with the suctioning fan 71 for suctioning air and a unit for collecting dust, enabling the suctioning of dust and foreign substances. Also, the cleaning unit 160 may further include an agitator (not shown).

The sensor unit 120 may emit light to sense the location of obstacles or a distance from obstacles around the robot cleaner and with respect to the traveling direction. The sensor unit 120 may be rotated by the sensor drive unit 130 to sense obstacles around the robot cleaner 1 and may send the sensed data to the controller 110.

In this case, the sensor unit 120 may recognize obstacles within a range of about 4 m to about 5 m from the robot cleaner 1. The sensor unit 120 may include a complex sensor or a Long Distance Sensor (LSD) that can recognize distant obstacles by emitting a laser beam.

The sensor drive unit 130 may be connected to the sensor unit 120 to vertically move or rotate the sensor unit 120.

Also, the sensor unit 120 may sense the surrounding of the robot cleaner 1 with different sensitivities according to the set mode. In this case, during the traveling, the sensor unit 120 may be set to a first mode of high sensitivity to sense obstacles around the robot cleaner 1, and during the searching for the recharging base, the sensor unit 120 may be set to a second mode. In this case, since the recharging base is attached with a reflective sheet of high luminance, the sensor unit 120 may sense the recharging base by receiving light reflected by the reflective sheet of the recharging base in the second mode.

The robot cleaner 1 may further include a plurality of sensors in addition to the sensor unit 120. The plurality of sensors may assist in the information collection of the sensor unit 120, or may sense the approach of users, the condition of the floor, and the amount of light.

The location calculation unit 140 may calculate the location of the robot cleaner 1, based on data inputted from the sensor unit 120. Also, the location calculation unit 140 may calculate the distances from obstacles and the locations of the obstacles sensed by the sensor unit 120.

Also, the location calculation unit 140 may analyze data sensed by the sensor unit 120 to create a map of the cleaning area based on the calculated locations, and may map the current location of the robot cleaner 1 and the locations of obstacles.

The location calculation unit 140 may send the created map and the calculated location information to the controller 110 to store the information in the data unit 160. The location information may be stored as coordinates.

The location calculation unit 140 may calculate the traveling distance and the traveling direction based on the data of the sensor unit 120, and thus calculate the location of the robot cleaner 1. In this case, the location calculation unit 140 may compare data of the sensor unit 120 received by the controller 110 to calculate the traveling distance.

The path setting unit 150 may set a traveling path to a target point, based on the location of the robot cleaner 1, the locations of obstacles, and the information on the cleaning area, calculated by the location calculation unit 140.

The path setting unit 150 may reset a path to avoid an obstacle when there is an obstacle on the traveling path of the robot cleaner 1, and may set the shortest traveling path. In this case, the shortest path for traveling while avoiding an obstacle before approaching the obstacle may be set at the time point when the obstacle is sensed. However, while the cleaning is being performed, the path may be set such that the traveling direction is changed after approaching the obstacle by a certain distance.

The path setting unit 150 may first determine whether or not an obstacle can be avoided upon setting of the traveling path, and may set the path based thereon. The set path information may be stored in the data unit 160.

When it is impossible to avoid an obstacle or move to a target point, that is, it is impossible to set the traveling path to the target, the path setting unit 150 may send error information to the controller 110.

The controller 110 may apply a control command to the sensor drive unit 130 to control the operation of the rising & falling drive unit and the rotation drive unit of the sensor drive unit 130, and may control the operation of the sensor unit 120. The controller 110 may recognize surrounding obstacles in response to signals sent by the sensor unit 120, and may control the traveling unit 180 such that the traveling direction is changed according to the set path. Also, the controller 110 may control the cleaning unit 170 according to the inputted setting to perform the cleaning. Also, the controller 110 may control the data input/output of the input unit 195 and the display unit 190, and may allow sensed or generated data to be stored in the data unit 160.

The controller may include a microprocessor that processes electric signals from an image sensor of the sensor unit 120. During the traveling of the robot cleaner 1, the controller 110 may analyze signals sent from the sensor unit 120 to apply data to the location calculation unit 140, and may control the traveling unit 180 based on the path information set by the path setting unit 150.

In this case, the controller 110 may include more than one controller. For example, the robot cleaner 1 may include a plurality of controllers for controlling each component. In this case, the controller 90 may be defined as a part or all of the plurality of controllers. The controllers need only to be electrically connected to each other in terms of transmission/reception of signals. The spatial disposition between the controllers may be irrelevant to the definition of the controller. If necessary, the location calculation unit and the path setting unit may be included in the controller.

Figure 4A:
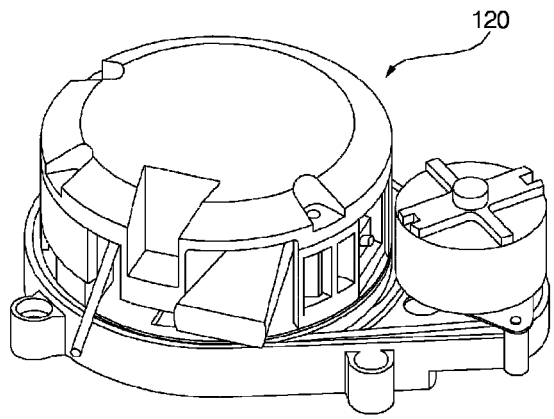
FIGS. 4A and 4B are views illustrating a sensor unit of a robot cleaner according to an embodiment of the present invention.
Figure 4B:
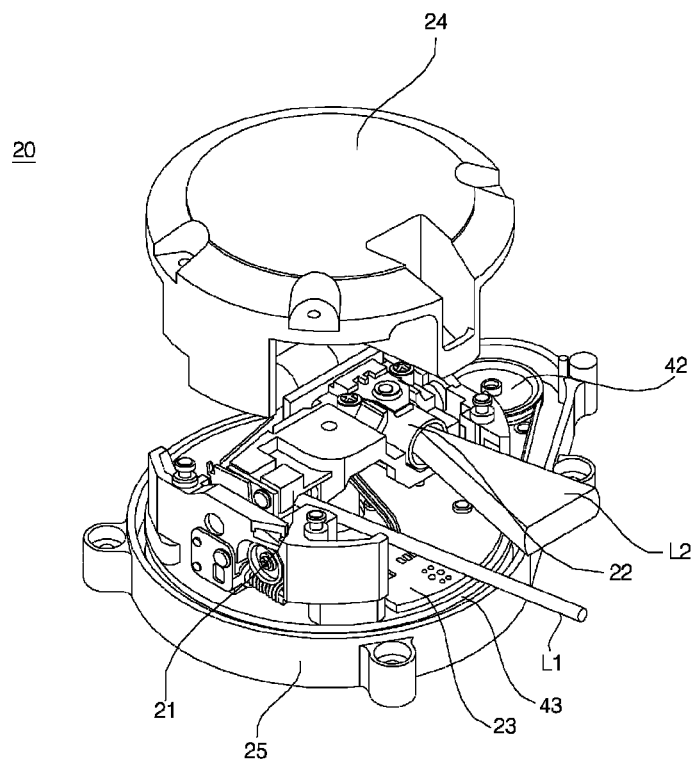

FIGS. 4A and 4B are views illustrating a sensor unit of a robot cleaner according to an embodiment of the present invention.

As shown in FIGS. 4A and 4B, a sensor unit 120 may sense the location of obstacles and the distances from obstacles by emitting light L1. The sensor unit 120 may be rotatably and vertical movably disposed in the main body. The sensor unit 120 may include a light emitting unit 21, a light receiving unit 22, and a base 23.

A sensor drive unit 130 may include a rising & falling drive unit (not shown) that vertically moves the sensor unit 120, a tilting drive unit (not shown) that controls the sensing angle of the sensor unit 120, and a rotation drive unit (not shown) that rotates the sensor unit 120.

The light emitting unit 21, which emits light L1, may include a light source and a collimate lens that refracts light emitted from the light source so as to travel in parallel. The light source may include a light emitting body, e.g., an infrared or visible ray light emitting diode (LED) that emits infrared rays or visible rays. Preferably, the light source may be a light emitting body that emits a laser beam. In this embodiment, a laser diode (LD) 210 will be exemplified as the light source. Particularly, the light source using a laser beam may enable accurate measurement compared to other lights due to the monochromatic, directionality, and collimation characteristics of a laser beam. For example, compared to laser beam, infrared rays or visible rays may vary in measurement accuracy according to the ambient environmental factors such as color or quality of a subject.

The light receiving unit 22 may include an image sensor on which light L2 reflected or scattered by obstacles is sensed. The image sensor may be an assembly of a plurality of unit pixels that are arranged in a matrix form of n×m. Each unit pixel may be implemented with various kinds of light receiving elements such as cadmium sulfide cell (CdS), photo diode, photo transistor, solar cell, and photoelectric tube. These light receiving elements may convert optical signals into electric signals. One example of an image sensor may be a complementary metal-oxide semiconductor (CMOS) sensor. Also, the light receiving unit may include a light receiving lens. Light reflected or scattered by obstacles may be refracted by the light receiving lens to form an image on the image sensor. The light receiving lens may include a plurality of lenses.

The base 23 may support the light emitting unit 21 and the light receiving unit 22, and may be rotatably and vertically movably disposed in the main body 10. The light emitting unit 21 and the image sensor may be disposed at a certain interval on the base.

Meanwhile, a supporter 25 may be further provided to support the sensor unit 120. The base 23 may be rotatably supported by the supporter 25. The supporter 25 may be fixed on the lower body 11 by coupling members such as screw or bolt. In this case, the rising & falling drive unit described later may allow the base 23 to rise and fall, but the present invention is not limited thereto. According to embodiments, the supporter 25 may be vertically movable with respect to the lower body 11 by the rising & falling drive unit.

A base cover 24 may be coupled to the base 23, and may rotate together with the base. A light transmitting passage through which light L1 emitted from the light emitting unit 21 passes and a light receiving passage through which light received in the light receiving unit 22 passes may be formed between the base cover 24 and the base 23.

The rising & falling drive unit may allow the sensor unit 120 to rise and fall. The rising & falling drive unit may include a linear or rotational motor. In order to allow the sensor unit 120 to rise and fall, a power transmission unit may be provided to perform power transmission or conversion between the rising & falling drive unit and the sensor unit 120. The power transmission unit may be implemented with members such as gear, pulley 42, and belt 43. For example, when a rotational motor is used for the rising & falling drive unit, the power transmission unit may include a drive pinion rotated by the motor, and a rack fixedly disposed in the base and engaged with the drive pinion.

The sensor unit 120 may rise and fall through a rise & fall aperture formed in the upper part of the main body. When the sensor unit 120 is placed at the falling location, light L1 emitted from the light emitting unit 21 of the sensor unit 120 may travel to the front side of the main body through the transparent member disposed in the sensor unit 120, and light L2 reflected or scattered by obstacles L2 may pass through the transparent member to be incident into the light receiving unit 22.

When the sensor unit 120 is placed at the rising location, the sensor unit 120 may upwardly protrude from the main body through the rise & fall aperture, and the light emitting unit 21 and the light receiving unit 22 may also be located at the upper side of the main body.

FIGS. 5 and 6 are views illustrating an obstacle or distance sensing principle of a sensor unit.

FIG. 5 is a view illustrating a principle of measuring a distance from an object. Referring to FIG. 5, the basic principle of sensing the location of an object using the sensor unit 120 may be based on a triangulation method.

Light emitted from the light source 210 may have a certain angle θ with respect to the main axis C that is orthogonal from a center surface of the light receiving lens 230. The angle θ may be closely related with the accuracy of the distance measurement from the object. If the angle θ is too small, it may be difficult to measure a distance from an object at a close range. On the other hand, if the angle θ is too large, it may be difficult to measure a distance from an object at a long range. Accordingly, the angle θ needs to have an appropriate value such that an object located at a range from about 0.1 m to about 4 m can be measured.

The image sensor 220 may be disposed such that it is spaced from the light source 210. The light receiving lens 230 may be disposed between the image sensor 220 and the object or obstacle 300. In this case, when a distance between the obstacle 300 and the light receiving lens 230 is defined as an object distance L, the object distance L can be expressed as Equation 1 below.

$$L = \frac{-fg}{p - f\tan\Theta} \quad (1)$$

Here, f is a focal length, g is an interval between a light source and a lens, θ is an angle between light emitted from the light source 210 and the main axis C of the light receiving lens 230, and p indicates the location of a spot of the image sensor 220 where light reflected or scattered by the object is detected, based on the center O of the image sensor 220.

FIG. 6A is a view illustrating a spot 121 formed on an image sensor of a sensor unit. FIG. 6B is a view illustrating three-dimensional mapping based on location information acquired by the image sensor of the sensor unit 120.

Referring to FIG. 6A, on a matrix of m×n indicating the location of spots 121 formed on the image sensor 220, the row corresponds to the rotational angle ω of the base 23, and the column corresponds to the rise height H of the tilting unit 50. The respective pixels of the image sensor 220 indicate the obstacle distribution situation in the cleaning area.

The location information of the respective pixels constituting the image sensor 220 may include distances from obstacles corresponding to each pixel as well as coordinates on the matrix. Accordingly, the three-dimensional location information of the obstacles corresponding to the respective pixels can be acquired by the location information of the respective pixels.

While the base 23 rotates by one cycle, the spots 121 formed on the image sensor 220 may be indicated in the same row. Accordingly, the values of the columns of the spot coordinates in the matrix may correspond to the rotational angle ω of the base 23.

The rotation of the base 23 may be considered as turning within a certain range, or may be considered as 360 degrees or more rotation. For example, the rotation drive unit 40 may continuously rotate the base 23 in one direction. In this case, when the sensor unit 120 is at the falling location, since spots are formed on the image sensor 220 only when light emitted from the light emitting unit passes through the transparent member 32, the location information used for the mapping of the cleaning area may be obtained from a section corresponding to the profile of the transparent member 32, for example, section between 0 degree to 180 degrees.

When the base 23 is at the second location, particularly, upwardly protruded from the main body, the controller may control the rotation drive unit 40 such that the base 23 rotates at least 360 degrees. Thus, the obstacle situation of the 360 degree full range around the robot cleaner 1 can be scanned.

Also, the height of the base 23 may vary with the operation of the rising & falling drive unit 50, and the base 23 may be rotated by the rotation drive unit 40 at each height. Accordingly, values of the rows of the spot coordinates on the matrix may correspond to the height H of the base 23.

In this regard, the spots 121 are distributed in only one row in FIG. 6A, but the spots 121 can be distributed in three rows in addition thereto as described in FIG. 6B. The spots in each row may be spots formed on the image sensor 220 at three different heights at which the base 23 is allowed to rise and fall by the operation of the rising & falling drive unit 50. For example, the arrangement of the spots may be shown in a plurality of rows when obstacles exist over the upper and lower part within the cleaning area.

In other words, the sensor unit 120 according to an embodiment of the present invention can scan the cleaning area while rising & falling and rotating with respect to the main body. In this case, the coordinates of the spots formed on the image sensor 220 may correspond to the rise & fall height H of the base 23 in row, and may correspond to the rotational angle ω of the base 23 in column. Accordingly, the controller can three-dimensionally map the obstacle distribution situation in the cleaning area from the coordinates of the spots and the distances from the obstacles corresponding to each spot in accordance with Equation (1) described above. Hereinafter, the height H of an obstacle, rotational angle ω, and the distance L in relation to the robot cleaner 1 corresponding to each spot will be referred to as location information.

The controller can map the obstacle distribution situation in the cleaning area, based on the location information.

FIG. 6B, which shows mapping of the coordinates [ω, ω2, L] of each pixel on X-Y-Z space, three-dimensionally shows the obstacle situation in the cleaning area. Since the location on Z-axis is assigned according to the object distance L corresponding to each pixel, it is shown in FIG. 6A that X-Y plane where pixels are located is distorted in the Z-axis direction.

The base 23 may vertically move according to the operation of the rising & falling drive unit 50. Hereinafter, the location where the base 23 falls is defined as a first location, and the location where the base 23 rises is defined as a second location. Here, it should be noted that the location of the base 23 is not necessarily limited to the two locations. That is, the first location and the second location need to be construed as relative to each other. The operation of the rising & falling drive unit 50 may be controlled such that location of the base 23 can be subdivided between the lowest falling location and the highest rising location, enabling the sensing of obstacles at each location. As described above, the distribution of the spots when ranges covering three or more rows are scanned is shown. This means that the obstacles are sensed at three or more locations where the heights of the base 23 are different from each other.

The base 23 may be housed in the main body at the first location. In this case, light emitted from the light source 210 may travel toward obstacles through the front side of the main body. The main body may have an opening at the front side thereof to allowing light emitted from the light source 210 to pass through. According to embodiments, the opening may be provided with a transparent member 32 passing light. Light emitted to obstacle at the first location may travel in a substantially horizontal direction.

When the base 23 is at the second location, light emitted from the light source 210 may travel toward obstacles from the upper side of the main body. The traveling direction of light may be substantially parallel to the traveling direction at the first location. Accordingly, since obstacles sensed by light emitted when the base 23 is at the second location are at higher locations than those sensed at the first location, three-dimensional obstacle information for the cleaning area can be obtained.

More specifically, the controller may perform at least one of a first obstacle sensing control of rotating the base 23 by controlling the rotation drive unit 40 at the first location and a second obstacle sensing control of rotating the base 23 by controlling the rotation drive unit 40 after raising the base 23 to the second location by controlling the rising & falling drive unit 50. The first obstacle sensing control may be to sense the location of obstacles distributed at a relatively lower location in the cleaning area, and the second obstacle sensing control may be to sense the location of obstacles distributed at a relatively higher location than the first obstacle sensing control. Regarding the same obstacle, the location information acquired by the first obstacle sensing control and the location information acquired by the second obstacle sensing control may include information regarding the same obstacle on the plane. In this case, however, according to the height of an obstacle to be sensed, the location information acquired by the second obstacle sensing control may indicate that the obstacle exists at a certain location on the plane while the location information acquired by the first obstacle sensing control indicates that the obstacle does not exist at the same location on the plane. Such may be a case where a certain space (not sensed at the first location) exists under a bed frame (obstacle sensed at the second location) supporting a bed, for instance.

The controller may control the traveling unit 180 based on the obstacle situation in the cleaning area, i.e., ambient obstacle situation acquired by the mapping or the location information acquired by the image sensor 220.

Figure 7:
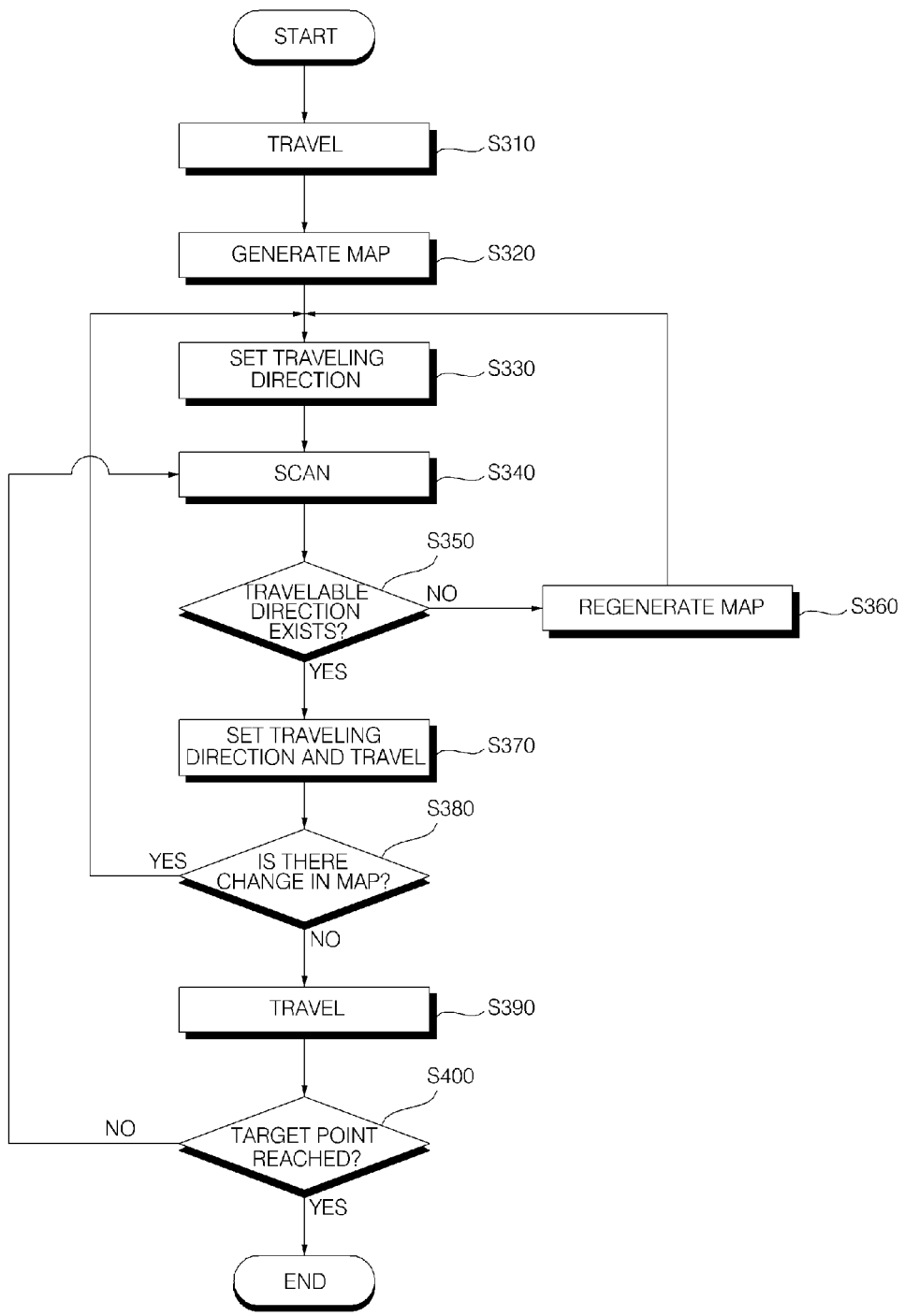
FIG. 7 is a flowchart illustrating a traveling method of a robot cleaner according to an embodiment of the present invention.

FIG. 7 is a flowchart illustrating a traveling method of a robot cleaner according to an embodiment of the present invention.

As shown in FIG. 7, the robot cleaner may perform cleaning while traveling according to a set mode (S310). When the cleaning is set to start at a specific area or location, the controller 110 may control the traveling unit 180 such that the corresponding location is set to a target point and the robot cleaner travels to the target point.

In this case, the controller 110 may set the sensitivity of the sensor unit 120 as the first mode of high sensitivity to allow the sensor unit 120 to sense obstacles location on the traveling path during the traveling of the robot cleaner 1.

The controller 110 may remove foreign substances on the floor during the traveling by controlling the cleaning unit 170 according to the cleaning setting.

The controller 110 may analyze and convert signals sent from the sensor unit 120, and may apply data to the location calculation unit 140 during the traveling.

The location calculation unit 140 may analyze the data of the sensor unit 120 sent from the controller 110 to analyze the structure of surrounding obstacles on the basis of the current location of the robot cleaner and then generate a map about obstacles.

For example, when an obstacle is sensed to exist at either left side or right side, the location calculation unit 140 may calculated a distance from the obstacle, and may generate a map by marking the obstacle for each pixel at a certain interval as described in FIGS. 6A and 6B. When the markings for obstacles are connected in line to each other, the map by which the indoor structure and the location of obstacles can be recognized may be generated.

The location calculation unit 140 may partially generate the map based on the current location of the robot cleaner and the data inputted from the sensor unit 120, and may repeat the map generation based on data additionally inputted during the traveling. Thus, the map about the whole indoor region can be completed.

The path setting unit 150 may set the traveling direction for traveling to a set target point (S330).

While rotated by the sensor drive unit 130, the sensor unit 120 may scan the surroundings of the robot cleaner 1 (S340).

The sensor unit 120 may scan the surroundings of the robot cleaner 1 while continuously rotating during the operation of the robot cleaner 1.

The data sensed by the sensor unit 120 may be sent to the controller 110 to be analyzed and converted, and the location calculation unit 140 may receive the data of the sensor unit 120 from the controller 110 to calculate the location of the robot cleaner 1 and the location of obstacles.

The path setting unit 150 may determine whether or not it is possible to travel in a direction that is currently set based on the calculated location of obstacles or whether there is a travelable direction (S350).

When there is a travelable direction, the path setting unit 150 may set the traveling direction so as to avoid obstacles, and may send information on the changed traveling direction to the controller 110 (S370). The controller 110 may control the traveling unit 180 such that the robot cleaner 1 travels along the changed traveling direction.

On the other hand, when there is no travelable direction, an error due to the impassability may be sent to the controller 110.

The controller 110 may control the location calculation unit so as to regenerate the map. The location calculation unit 140 may regenerate the map based on the data of the sensor unit 120, and may apply changed information to the path setting unit 150 (S360). In this case, the controller 110 may change a level about the sensing range of the sensor unit 120, and the location calculation unit 140 may regenerate the map based on the new data of the changed sensing range.

The path setting unit 150 may re-determine whether or not there is a travelable direction based on the changed map, and may set the traveling direction to allow the robot cleaner 1 to travel (S330 to S370).

As described above, the sensor unit 120 may continuously scan the surroundings of the robot cleaner 1 during the operation of the robot cleaner 1, and the location calculation unit 140 may generate a new map based thereon or map the location of obstacles.

In this case, when there is a change in the map, the controller 110 may control the path setting unit 150 and the location calculation unit 140 to reset the traveling direction. Thus, the robot cleaner 1 can travel in a new traveling direction (S330 to S380).

The controller 110 may control the traveling unit 180 such that the robot cleaner 1 travels along the set traveling path until the robot cleaner 1 reaches the target point. When the robot cleaner 1 does not reach the target point, the robot cleaner 1 may travel to the target point while modifying the traveling path based on data scanned by the sensor unit 120.

When the robot cleaner 1 reaches the target point, the robot cleaner 1 may complete the traveling, and then may start the set cleaning or wait for a next command. When the target point is the recharging base, the controller 110 may allow the robot cleaner 1 to dock with the recharging base to charge the battery.

Figure 8:
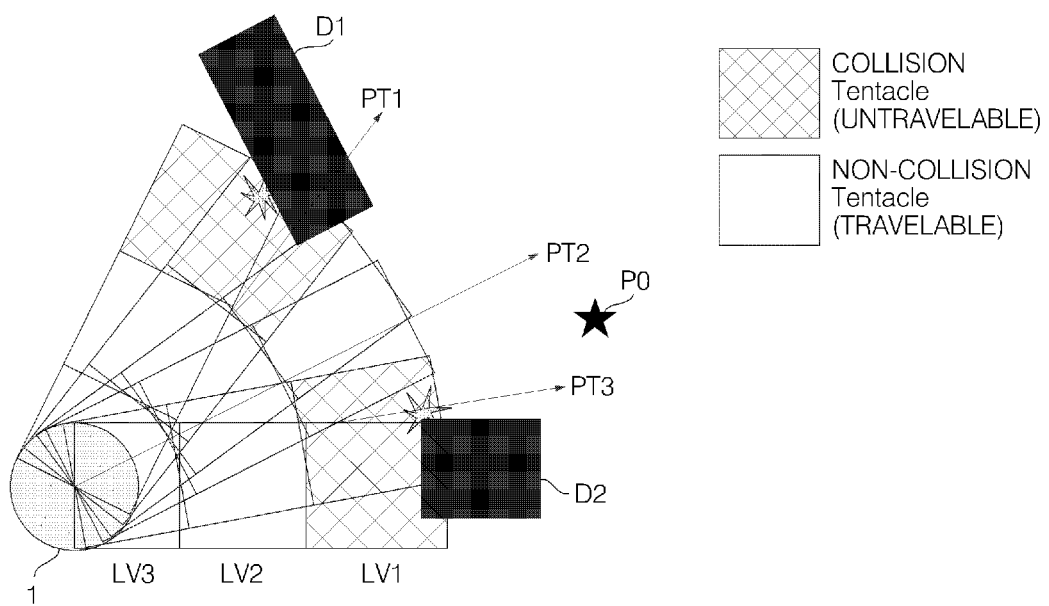
FIG. 8 is a view illustrating an example of setting a traveling direction of a robot cleaner according to an embodiment of the present invention.

FIG. 8 is a view illustrating an example of setting a traveling direction of a robot cleaner according to an embodiment of the present invention.

When obstacles are sensed by the sensor unit 120 and the locations of obstacles are calculated by the location calculation unit, the path setting unit 150 may determine whether or not the set traveling path is travelable, and may determine whether or not there is a travelable direction avoiding obstacles.

As show in FIG. 8, when the path setting unit 150 determines that there is no travelable direction and an error signal is sent, the controller 110 may change the level about the sensing range of the sensor unit.

The sensor unit 120 may scan a range of about 4 m to about 5 m, and the controller 110 may change the sensing range based on three levels of the sensor unit 120. In this case, to divide the sensing range into the three levels is merely an example. Accordingly, the sensing range may be divided into three or more levels.

For example, the sensing range may be divided into a first level LV1 that is the maximum recognizable distance of the robot cleaner, a second level LV2 that is two-thirds of the maximum recognizable distance, and a third level LV3 that is one-third of the maximum recognizable distance.

The controller 110 may control the sensing range of the sensing unit 120 according to the error signal of the path setting unit 150. When the sensing range is currently set is the first level, the controller may set the sensing range to the second level. When the current sensing range is the third level that is the maximum level, the sensing range may be extended, or an error may be displayed.

In this case, the reduction of the sensing range may be to travel regardless of distant obstacles and approach obstacles by a certain distance and then move along obstacles, or to reset the traveling direction according to data sensed at a short range. When it is necessary to maximally approach obstacles, for example, to clean the surrounding of obstacles, the sensing range may be minimized.

When the sensing unit 120 of the robot cleaner 1 performs the first level of sensing, it is possible to sense a second obstacle D2 that exists in the traveling direction, but it is impossible to sense the second obstacle at the second or third level. In this case, since the robot cleaner moves to a recognizable distance and then determines whether to avoid the second obstacle, the robot cleaner 1 needs to approach the obstacle by a certain distance.

Accordingly, when the approach to the obstacle is needed, the sensing range may be reduced. When the minimum traveling is needed, the obstacle may be sensed in advance at the maximum sensing range to set a path for avoiding the obstacle with the minimum traveling.

In FIG. 8, the path setting unit 150 may first determine whether or not it is possible to travel to a target point P0 avoiding the first and second obstacles D1 and D2.

When the robot cleaner 1 directly travels to the target point P0, the robot cleaner 1 may collide with the second obstacle D2. Also, when the robot cleaner 1 travels in a first direction PT1, the robot cleaner 1 may collide with the first obstacle D1. When traveling in a third direction PT3, the robot cleaner 1 may collide with the second obstacle D2. Accordingly, the path setting unit 150 may set the traveling direction as a second direction PT2.

Even though the second direction differs from the direction of the target point P0, the second direction is a direction that can avoid the obstacle. Accordingly, the traveling direction of the robot cleaner 1 may be changed into the second direction to avoid the obstacle, and then may be changed into the direction towards the target point P0.

Figure 9:
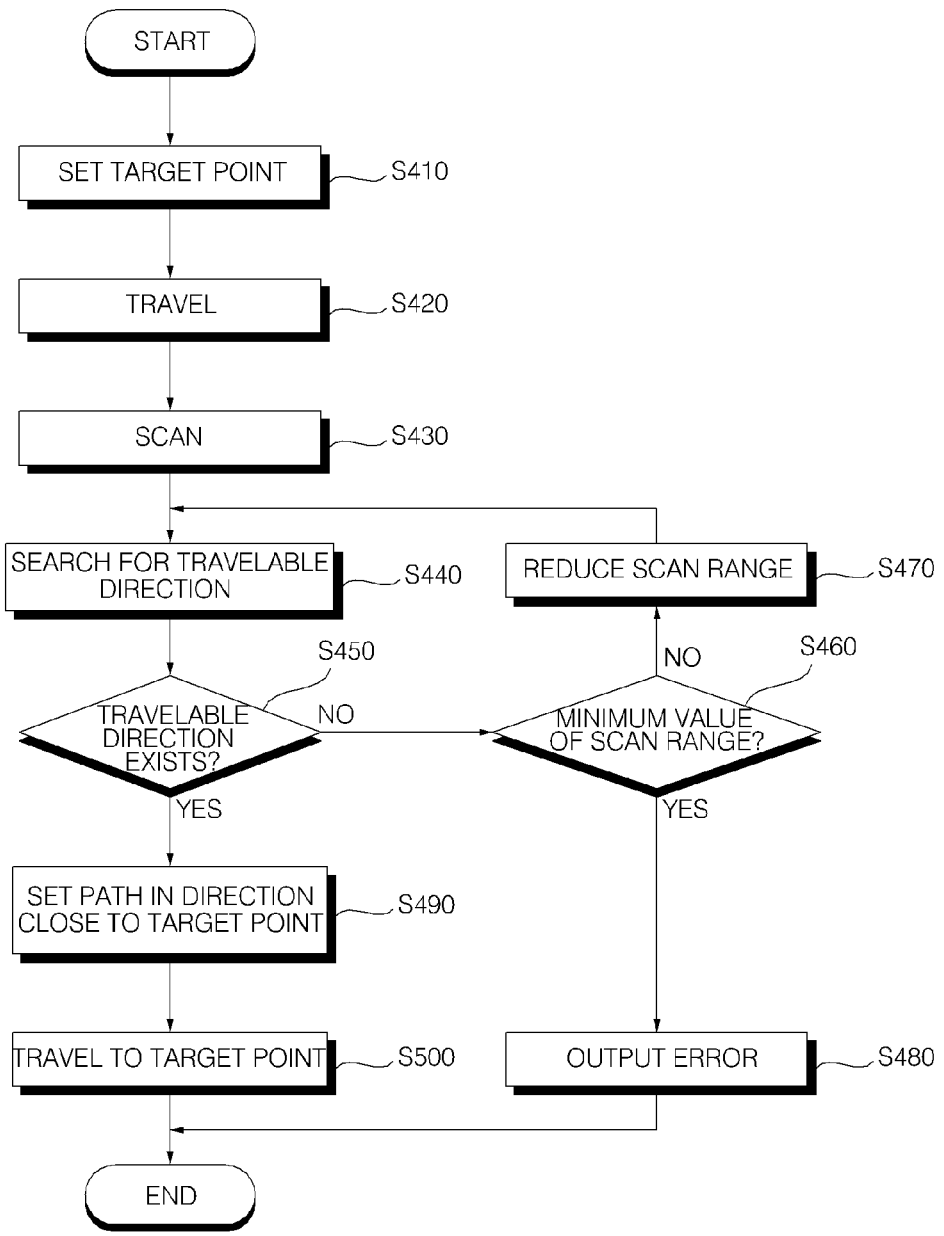
FIG. 9 is a flowchart illustrating a traveling method of a robot cleaner while sensing obstacles according to an embodiment of the present invention.

FIG. 9 is a flowchart illustrating a traveling method of a robot cleaner while sensing obstacles according to an embodiment of the present invention.

Referring to FIG. 9, the controller 110 may set the target point (S410), and the path setting unit 150 may set the traveling direction and path according to the target point. In this case, the target point may include a location where cleaning is initiated, an area to be cleaned next time after cleaning is finished, or a recharging base for charging battery. Also, the target point may be a location to which the robot cleaner 1 intends to move next time during the cleaning or traveling and a location to be cleaned next time.

The controller 110 may control the traveling unit 180, and the traveling unit 180 may drive a motor to allow the robot cleaner 1 to travel to the target point (S420). In this case, the sensor unit 120 may scan the surroundings of the robot cleaner 1 at the first level that is the maximum scan range (S430).

The location calculation unit 140 may analyze the data of the sensor unit 120 inputted from the controller 110 to perform mapping about the surroundings of the robot cleaner 1 during the traveling of the robot cleaner 1, and may sense obstacles to calculate the location of obstacles.

As the location of obstacles is calculated by the location calculation unit 140, the path setting unit 150 may search for a travelable direction for the target point (S440).

It may be determined whether or not there is a travelable direction (S450). When there is no travelable direction, it may be determined whether or not the scan range of the sensor unit 120 is set to the minimum value (S460).

When the scan range of the sensor unit 120 is not set to the minimum value, the controller 110 may reduce the scan range of the sensor unit 120 by one level (S470). That is, when the current scan range is the first level, the scan range may be reduced to the second level, and when the current scan range is the second level, the scan range may be changed into the third level. In this case, the first level of scan range may be considered as the maximum scan range.

In the case, the scan range of the sensor unit 120 is the first level that is the minimum value, the controller 110 may output an error (S480).

Otherwise, the sensor unit 120 may scan the surroundings of the robot cleaner 1 at the changed scan range, and the path setting unit 150 may determine whether or not there is a travelable direction according to new data.

Based on the data of the sensor unit 120, when there is a travelable direction, the path setting unit 150 may set a path in a direction close to the target point (S490).

The controller 110 may control the traveling unit 180 according to the traveling direction and path that are set by the path setting unit 150, and the robot cleaner 1 may travel to the target point (S500).

Figure 10:
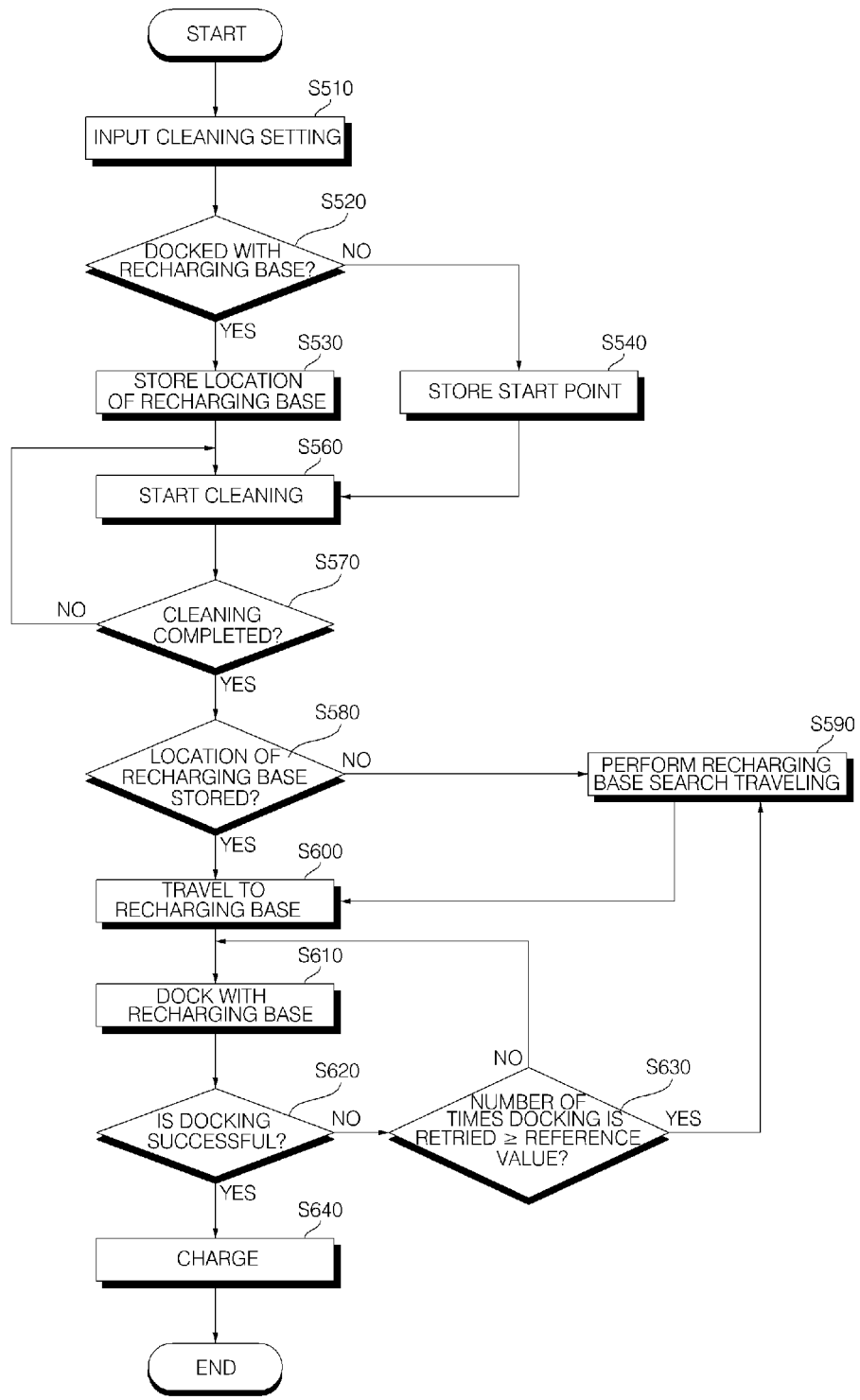
FIG. 10 is a flowchart illustrating a returning method of a robot cleaner to a recharging base according to an embodiment of the present invention.

FIG. 10 is a flowchart illustrating a returning method of a robot cleaner to a recharging base according to an embodiment of the present invention.

Referring to FIG. 10, when the cleaning setting is inputted into the robot cleaner 1 (S510), the controller 110 may perform a certain cleaning operation according to the cleaning setting through the input unit 195.

In this case, the controller 110 may determine the current condition and location of the robot cleaner 1 before initiating cleaning, and may determine whether or not the robot cleaner 1 is docked with the recharging base (S520). The controller 110 may determine whether or not the robot cleaner 1 is located at the recharging base according to the docking state between the robot cleaner 1 and the recharging base.

When the robot cleaner 1 is docked with the recharging base, the controller 110 may store the current location as the location of the recharging base (S530). On the other hand, when the robot cleaner 1 is not docked with the recharging base, the controller 110 may store the current location as the start location (S540). The location information may be stored in the data unit 160.

The controller 110 may control the traveling unit 180 and the cleaning unit 170 to allow the cleaning unit 170 to suction foreign substances while traveling around the cleaning area (S560).

When the set cleaning is completed (S570), the controller 110 may determine whether or not the location of the recharging base is stored (S580).

The controller 110 may set a target point according to the stored location information of the recharging base, and may control the traveling unit 180. When the location of the recharging base is stored, the robot cleaner 1 may travel to the recharging base that is a target point.

On the other hand, when the location of the recharging base is not stored, the controller 110 may perform recharging base search traveling (S590). The robot cleaner 1 may travel while searching for the recharging base (S600).

The robot cleaner 1 that has moved to the recharging base may try to dock with the recharging base (S610), and the controller 110 may determine whether or not the docking is successful. When a docking sensing signal is inputted, the controller 110 may determine that the docking is successful (S620).

When the docking is unsuccessful, the controller 110 may count the number of times the docking is retried, and may determine whether or not the number of times the docking is retried is equal to or greater than a reference value (S630). When the number of time the docking is retried is smaller than the reference value, the docking with the recharging base may be retried (S610).

When the docking is completed, the controller 110 may supply a charging current from the recharging base to the battery (S640).

Figure 11:
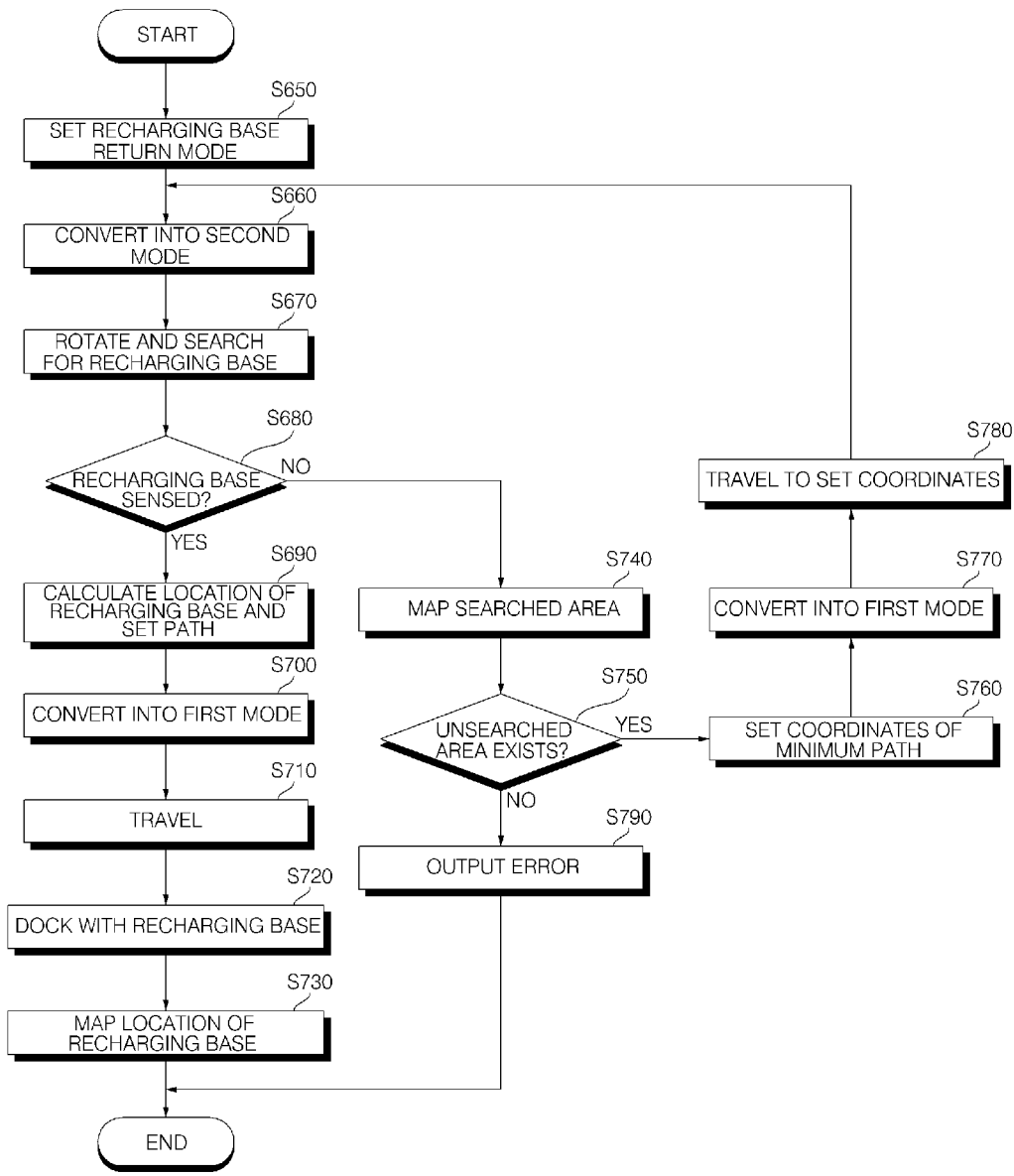
FIG. 11 is a flowchart illustrating a recharging base searching method using a change of the sensitivity of the sensor unit of a robot cleaner according to an embodiment of the present invention.

FIG. 11 is a flowchart illustrating a recharging base searching method using a change of the sensitivity of a robot cleaner according to an embodiment of the present invention.

Referring to FIG. 11, when the set cleaning is completed, or the battery charging is needed, the controller 110 may set to a recharging base return mode to allow the robot cleaner 1 to return to the recharging base (S650).

The controller 110 may control the sensor unit 120 to convert into the second mode (S660), and may control the traveling unit 180 such that the robot cleaner rotates in place to allow the sensor unit 120 to search for the recharging base (S670).

In this case, the sensor unit 120 may be set to the first mode for sensing the surroundings with high sensitivity during the general traveling, and may be set to the second mode of low sensitivity during the searching for the recharging base. The recharging base may be attached with a reflective sheet of high luminance, for example, and when the sensor unit 120 is set to the second mode of low sensitivity, the controller 110 may analyze a signal inputted from the sensor unit 120 to search for the recharging base and recognize the recharging base according to the reflectance.

When the recharging base is sensed (S680), the controller 110 may apply the data of the sensor unit 120 to the location calculation unit 140, and the location calculation unit 140 may calculate the location of the recharging base. The path setting unit 150 may set the traveling path based on the calculated location of the recharging base (S690).

The controller 110 may control the sensor unit 120 to convert into the second mode (S700), and may control the traveling unit 180 such that the robot cleaner 1 travels along the traveling path (S710).

When the robot cleaner 1 travels, as described above, the robot cleaner 1 may travel while avoiding obstacles and changing the scan range and the traveling path.

When the robot cleaner 1 reaches the recharging base that is the target point, the controller 110 may allow the robot cleaner 1 to dock with the recharging base (S720).

When the docking is completed, the controller 110 may map the location of the recharging base and store the map in the data unit 160, and then may receive a charging current from the recharging base to the battery to charge the battery (S730).

On the other hand, when the recharging base is not sensed, the controller 110 may apply the data of the sensor unit 120 to the location calculation unit 140, and the location calculation unit 140 may map the search area based on the data (S740).

The location calculation unit 140 may determine, based on the mapping data, whether or not there is an unsearched area among the whole area (S750).

When there is no unsearched area, the location calculation unit 140 may input an error signal into the controller 110, and the controller 110 may output an error according to the recharging base search failure (S790).

On the other hand, when there is an unsearched area, the path setting unit 150 may set the coordinates of the unsearched area as a target point and then may set the traveling path (S760).

The controller 110 may control the sensor unit 120 to convert into the first mode for general traveling (S770), and may control the traveling unit 180 such that the robot cleaner 1 travels to the set target point along the set traveling path (S780).

When the robot cleaner 1 reaches the target point that is the unsearched area, the controller 110 may convert the sensor unit 120 into the second mode, and may allow the robot cleaner 1 to rotate 360 degrees in place to search for the recharging base (S660 and S670).

When the recharging base is not found, it may be again determined whether or not there is an unsearched area, by mapping the searched area to search for the recharging base in the unsearched area (S740 and S780).

When the recharging base is found, as described above, the robot cleaner 1 may dock with the recharging base to charge the battery (S690 to S730).

Thus, the robot cleaner 1 may search and map the surroundings using the sensor unit 120, and may travel and search for the recharging base while avoiding obstacles based on the mapping data.

A robot cleaner and a method of operating the robot cleaner according to the embodiments of the present invention have an effect of accurately scanning the obstacle situation in the cleaning area. Particularly, the obstacle distribution situation in the cleaning area can be three-dimensionally scanned, and based thereon, appropriate avoidance or crossing traveling for obstacles can be performed.

Also, since the sensor unit can be set to a sensitive mode appropriate for search and traveling by varying the sensitivity, accurate and quick traveling of the robot cleaner is possible. Thus, since the obstacle distribution situation can be accurately scanned, the accuracy of recognizing a recharging base can be improved.

A method of operating a robot cleaner according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
a main body;
a traveling unit to allow the main body to travel;
a cleaning unit to suction foreign substances around the main body during the traveling;
a sensor unit that is rotatable to sense an obstacle using light reflected or scattered by the obstacle; and
a controller to control the traveling unit so as to travel along a traveling path and to control the cleaning unit so as to perform cleaning,
wherein the sensor unit comprises a first mode and a second mode that are set to differ from each other in sensitivity with respect to the reflected or scattered light, and
the controller changes the sensitivity of the sensor unit when a set mode is changed between the traveling and the searching for a reflective sheet.

2. The robot cleaner of claim 1, wherein the controller sets the sensitivity of the sensor unit as the first mode during the traveling and sets the sensitivity of the sensor unit as the second mode different from the first mode during searching for a recharging base.

3. The robot cleaner of claim 2, wherein the first mode is a high sensitive mode in which an object is recognized with a small amount of light due to a high sensitivity to the reflected or scattered light, and the second mode is a low sensitive mode in which the sensitivity to the reflected or scattered light is lower than the sensitivity of the second mode.

4. The robot cleaner of claim 1, further comprising a path setting unit that sets a traveling direction and a traveling path to be applied by the controller such that the robot cleaner travels to a target point by a shortest distance according to a location of the obstacle sensed by the sensor unit,
wherein when the obstacle is sensed by the sensor unit, the path setting unit sets the traveling direction and the traveling path that includes determining whether or not there is a travelable direction.

5. The robot cleaner of claim 4, wherein the path setting unit sets the traveling direction and the traveling path such that the robot cleaner avoids the obstacle before approaching the obstacle during the traveling without a cleaning, and avoids the obstacle after approaching the obstacle by a certain distance during the cleaning.

6. The robot cleaner of claim 4, wherein the controller changes a sensing range of the sensor unit when the path setting unit determines that there is no travelable direction.

7. The robot cleaner of claim 6, wherein the controller divides the sensing range into a plurality of levels based on a maximum recognizable distance of the sensor unit, and then reduces the sensing range of the sensor unit by one level.

8. The robot cleaner of claim 6, wherein the controller reduces the sensing range of the sensor unit to allow the traveling direction to be changed after the robot cleaner approaches the obstacle by a certain distance.

9. The robot cleaner of claim 2, wherein when the sensor unit is in the second mode, the controller controls the robot cleaner to search for the recharging base according to a reflectance of light reflected by the recharging base and received by the sensor unit.

10. The robot cleaner of claim 9, wherein the recharging base is attached with a reflective sheet of high luminance.

11. The robot cleaner of claim 1, further comprising a location calculation unit that calculates a location of the obstacle and a distance from the obstacle by analyzing the reflected or scattered light sensed by the sensor unit,
   wherein when a recharging base is not sensed by the sensor unit, the location calculation unit generates a map about an area to determine whether or not the area is an unsearched area, and when the area is the unsearched area, the controller controls the traveling unit such that the robot cleaner travels to the unsearched area to search for the recharging base.

12. The robot cleaner of claim 1, wherein the sensor unit comprises:
   a light emitting unit to emit light;
   a light receiving unit to receive light reflected or scattered by the light emitted from the light emitting unit;
   an image sensor to sense the received light through the light receiving unit;
   a base supporting the light emitting unit and the image sensor and rotatably disposed in the main body; and
   a rotation drive unit to rotate the base.

13. A method of operating a robot cleaner, comprising:
   setting a traveling mode by a controller;
   setting one of a first mode and a second mode having different sensitivities for incident light in a rotatable sensor unit by the controller to sense an obstacle using the incident light reflected or scattered by the obstacle;
   setting by the controller, upon traveling, the sensitivity of the sensor unit to the first mode to travel to a target point to avoid the obstacle sensed by the sensor unit; and
   changing the sensitivity of the sensor unit as a second mode by the controller while the robot cleaner is searching for a reflective sheet.

14. The method of claim 13, wherein the first mode is a high sensitive mode in which the obstacle is recognized with a small amount of light due to a high sensitivity to the incident light, and the second mode is a low sensitive mode in which the sensitivity to the incident light is lower than the sensitivity of the second mode.

15. The method of claim 13, further comprising calculating a location of the obstacle by a location calculation unit to change a traveling path such that the robot cleaner travels to the target point avoiding the obstacle when the obstacle is sensed by the sensor unit during the traveling.

16. The method of claim 13, further comprising changing a sensing range of the sensor unit by the controller when the obstacle is sensed by the sensor unit during the traveling and there is no travelable direction avoiding the obstacle.

17. The method of claim 16, comprising:
   reducing the sensing range by the controller one level after dividing the sensing range into a plurality of levels based on the maximum recognizable distance of the sensor unit; and
   outputting an error by the controller when there is no travelable direction avoiding the obstacle.

18. The method of claim 16, comprising allowing the robot cleaner to travel and changing the traveling direction after approaching the obstacle by a certain distance by reducing the sensing range of the sensor unit.

19. The method of claim 13, further comprising searching for the reflective sheet in place by rotating of the sensor unit,
   wherein the reflective sheet attached to a recharging base, and
   the recharging base is searched by the controller according to a reflectance with respect to light reflected by the reflective sheet and received by the sensor unit.

20. The method of claim 19, comprising:
   generating a map by a location calculation unit about an area when the recharging base is not sensed by the sensor unit; and
   setting a traveling path by a path setting unit if the controller determines that the area mapped by the location calculation unit is an unsearched area.

* * * * *